Oct. 4, 1949.  G. H. JACKSON  2,483,908
HEAVY TRUCK TIRE AND WHEEL DOLLY
Filed March 7, 1947

Inventor
George Harold Jackson

By *Clarence A. O'Brien*
*and Harvey B. Jacobson*
Attorneys

Patented Oct. 4, 1949

2,483,908

UNITED STATES PATENT OFFICE 2,483,908

HEAVY TRUCK TIRE AND WHEEL DOLLY

George Harold Jackson, Roberts, Idaho

Application March 7, 1947, Serial No. 733,117

2 Claims. (Cl. 214—65.4)

This invention appertains to novel and useful improvements in devices for lifting and removing wheels from automotive vehicles.

An object of this invention is to provide means for engaging and receiving the lower portion of a tire.

Another object of this invention is to provide means cooperating with said above-mentioned means for holding said tire in a predetermined position.

Another object of this invention is to provide means for securing and holding the upper portion of a conventional tire and wheel of an automotive vehicle.

A further object of this invention is to provide adjustable leverage means cooperating with all of said above-mentioned means for lifting and removing a conventional wheel and tire.

Ancillary objects and features of novelty of this invention as well as those specifically recited herein above will become apparent to those skilled in the art, in following the description of the preferred embodiment of the present invention, illustrated in the accompanying drawings, wherein.

Figure 1:
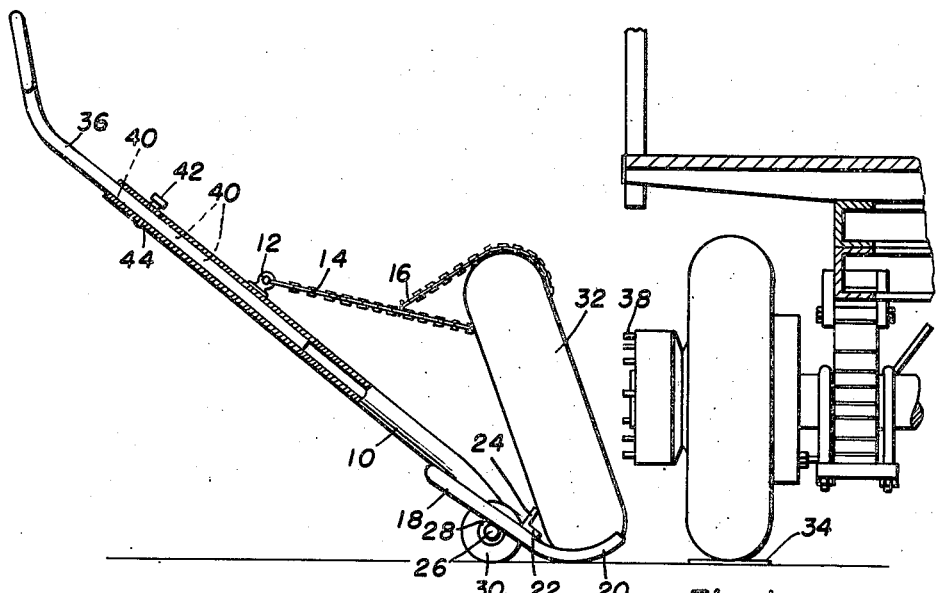
Figure 1 is primarily an elevational side view of the present invention with part broken away to show details of construction.

Referring now in detail to the illustrated preferred embodiment, like reference characters are used throughout to indicate similar elements thereof. It is a purpose of this invention to provide an extremely simple construction, both inexpensive and efficient. It is another purpose of this invention to provide means for sliding under one of the dual wheels in conventional heavy trucks, means for lifting said wheel, including the tire, and for sliding the entire assembly from the conventional lugs which hold the wheel as an operative portion of a truck. It is a further purpose of this invention that the means mentioned herein above might be used for lifting an end of a conventional light automotive vehicle from the ground for various purposes. This last-mentioned function obviates the necessity of a jack.

A sleeve 10 of some suitable material, preferably metallic, is provided with an eye member 12 suitably secured to the exterior thereof. Any suitable securing means may be used in this connection, preferably welding, brazing and the like. A chain 14 is suitably received in said eye member and a hook 16 is provided at the free end of said chain.

A U-shaped rod 18 is fixedly secured adjacent the terminal portion of said sleeve 10 and said U-shaped member is provided with arcuate terminal portions 20. It is here noted that since the substantially U-shaped member 18 is fixedly and immovably secured to the sleeve 10, said sleeve might be considered bifurcated at one end thereof. For ease in description the said sleeve will be described hereinafter as a bifurcated rod or sleeve.

A guide means is provided across said bifurcation 20 and is suitably secured thereto as by welding and the like. This guide means may be a simple angle member having a flange 22 resting on said bifurcation and an upwardly extending flange 24 extending therefrom. The flange 22 is also secured to the terminal portion of the said sleeve 10 for added rigidity of construction.

An axle 26 is secured in suitable bearings 28, which are rigidly secured to said bifurcation. Wheels 30 are rotatably received on the said shaft 26 for conveniently rolling the invention as desired.

The operation of the elements set forth herein above is as follows: A conventional tire which is received on a truck wheel or any conventional automotive vehicle wheel, is received on the said bifurcations 20 by simply rolling the same thereunder. As is apparent from an inspection of Figure 1, when dual wheels are used one of the same need only be slightly raised as by rolling on a board or plank 34. It is here noted that if a flat tire is to be removed the bifurcations may be forced under said tire without the use of said plank 34. Further, due to the spaced nature of the bifurcations, the ground contact points of the tire and wheel to be removed may be avoided and the bifurcation simply forced or slipped under the tire alongside of said ground contact point. The chain means 14 is then encircled about the upper portion of the tire and wheel and the hook 16 is suitably secured in a convenient link thereof, thereby locking said chain means about the upper portion of the tire and wheel. By slipping the bifurcations under the lower portion of the tire, the invention may be lifted until the guide means 24 rests against the outer wall of the said tire 22. It is now apparent that the tire and associated wheel are ready to be removed and accordingly the adjustable handle means 36, slidably received in the bore under said sleeve 10 may be rocked, breaking loose the seal between the lug 38 and the associated wheel apertures. Upon breaking loose said seal the tire may simply be rolled off, said tire and wheel being fixedly secured in the invention as described herein above.

Figure 2:
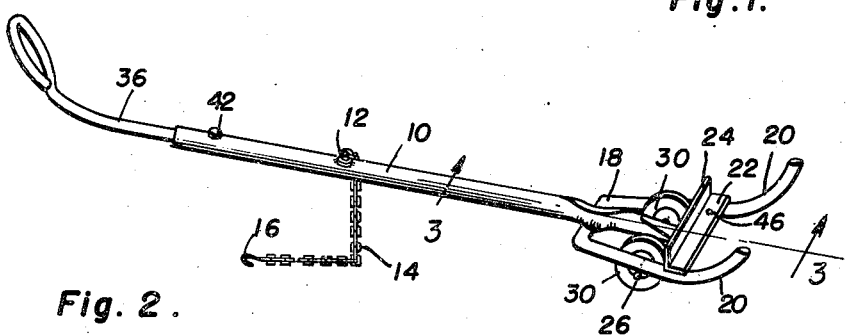
Figure 2 is a perspective view of the invention disclosed in Figure 1.
Figure 3:
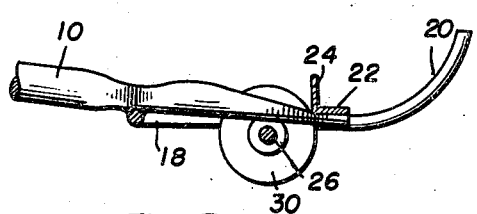
Figure 3 is a fragmentary longitudinal sectional view of the invention disclosed in Figure 2 and taken substantially on the line 3—3 thereof and in the direction of the arrows.

It is noted from an inspection of Figures 1 and 2 that the handle means is adjustable in nature relative to the sleeve 10. This construction is provided in order that a selective amount of leverage may be obtained in operation of the invention. The preferable adjusting means consists of the provision of a plurality of apertures 40 in the shank of the said handle means 36 adapted to receive a pin 42 therethrough. Said pin 42 also goes through a suitable aperture 44 provided through said bifurcated sleeve member 10. Obviously, this pin may simply be removed and the handle slid to the desired operative position, then held rigidly at that position by slipping said pin 42 through the apertures 40 and 44. This feature assumes importance particularly in lifting the back end or front end of an automobile entirely off the ground without assistance from a conventional jack. Obviously, this may be done due to the tremendous mechanical advantage offered by the leverage principle.

Figure 4:
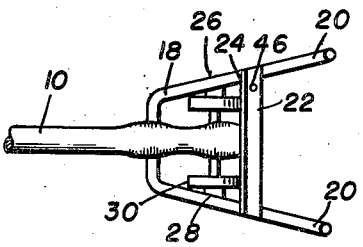
Figure 4 is a fragmentary plan view of the invention disclosed in Figure 2.

While this invention has been described as particularly adaptable to be used in connection with the lifting and removal of tires and their associated wheels, it is within the purview of this invention to use the same for lifting other heavy elements such as engines, differential and axle housings and the like. It is apparent from an inspection of Figures 2 and 4 that the chain 14 may be received in the aperture 46 provided in said flange 22, thereby embracing any impedimenta which might be placed on the bifurcation 20. It has been found that the transportation of an engine, commonly used in automobiles, from one location to another may be accomplished in an easy manner by this means.

While there has been described but a single preferred embodiment of the present invention, it is apparent to those skilled in the art that various changes including omissions and additions may be made herein without departing from the spirit of the invention. Accordingly, limitation is sought only in accordance with the scope of the following claims.

Having thus described the present invention, what is claimed as novel and improved is as follows:

1. A wheel dolly comprising a sleeve having an end portion, a substantially U-shaped member having a web and legs, said web being rigidly attached to said sleeve at a point spaced from said end, an angle member secured to said legs and the end of said sleeve adapted to engage the side of a tire in removing and mounting the same on a vehicle, the ends of said legs being smoothly curved to support the tread portion of a tire and to act as a cam surface in mounting and dismounting a tire and wheel of a vehicle.

2. A wheel dolly comprising a sleeve having an apertured end and a flat end, an apertured extensible handle disposed in the bore of said sleeve, a pin extending through the apertured handle and apertured sleeve to maintain said handle in selected extensible positions with relation to the sleeve, a flexible member attached to said sleeve intermediate its ends to support a tire and wheel in mounting and dismounting it on a vehicle, a substantially U-shaped member having a web and legs, said web being attached to said sleeve adjacent the flat end thereof and on the under surface of said sleeve, an angle member bridging and rigidly secured to said legs, said angle member being attached intermediate its ends to said flattened end of said sleeve and being disposed on said legs on the same side thereof as is attached to said sleeve, said legs having smoothly curved end portions, the curvature initiating at substantially the junction between the legs and said angle member, said smoothly curved end portions acting to support a wheel and tire and also as a cam surface, an axle secured to said legs and rollers mounted on said axle between said legs.

GEORGE HAROLD JACKSON.

REFERENCES CITED

The following references are of record in the file of this patent:

UNITED STATES PATENTS

| Number | Name | Date |
|---|---|---|
| 879,914 | Schriver et al. | Feb. 25, 1908 |
| 1,517,951 | Cade | Dec. 2, 1924 |
| 1,870,097 | Coller | Aug. 2, 1932 |
| 2,207,443 | Schneider | July 9, 1940 |
| 2,393,602 | Baum | Jan. 29, 1946 |
| 2,417,918 | Fatur | Mar. 25, 1947 |

FOREIGN PATENTS

| Number | Country | Date |
|---|---|---|
| 118,923 | Australia | Sept. 5, 1944 |
| 474,605 | Great Britain | Apr. 28, 1936 |